(12) United States Patent
Macfarlane et al.

(10) Patent No.: US 9,126,580 B2
(45) Date of Patent: Sep. 8, 2015

(54) METHOD AND SYSTEM FOR OPERATING VEHICLE ACCESSORIES

(71) Applicant: Ford Global Technologies, LLC, Dearborn, MI (US)

(72) Inventors: Kevin Macfarlane, Northville, MI (US); Nicholas Dashwood Crisp, Leigh-on-Sea (GB); Robert Michael Grant, Farmington Hills, MI (US); Hugh Hamilton, Troy, MI (US); Brian Jay Fedoroff, Livonia, MI (US); Gregory Blin, Billericay (GB); Peter Robert Brooks, Chelmsford (GB)

( * ) Notice: Subject to any disclaimer, the term of this patent is extended or adjusted under 35 U.S.C. 154(b) by 110 days.

(21) Appl. No.: 14/019,383

(22) Filed: Sep. 5, 2013

(65) Prior Publication Data
US 2015/0066292 A1    Mar. 5, 2015

(51) Int. Cl.
G06F 7/00 (2006.01)
B60W 10/30 (2006.01)
B60W 10/06 (2006.01)

(52) U.S. Cl.
CPC ............... *B60W 10/30* (2013.01); *B60W 10/06* (2013.01); *B60W 2510/30* (2013.01)

(58) Field of Classification Search
None
See application file for complete search history.

(56) References Cited

U.S. PATENT DOCUMENTS

| 3,692,007 A * | 9/1972 | Nilssen .................... 123/399 |
|---|---|---|
| 5,546,755 A | 8/1996 | Krieger |
| 6,155,230 A * | 12/2000 | Iwano et al. ............ 123/339.16 |
| 6,358,186 B1 * | 3/2002 | Kosik et al. .................... 477/176 |
| 6,878,092 B1 * | 4/2005 | Schustek et al. .................. 477/3 |
| 7,473,206 B2 | 1/2009 | Obayashi et al. |
| 7,490,000 B2 | 2/2009 | Siddiqui et al. |
| 7,710,068 B2 * | 5/2010 | Tani et al. ...................... 320/104 |
| 8,150,572 B2 * | 4/2012 | Yamamoto et al. ............. 701/22 |
| 8,831,808 B2 * | 9/2014 | Stanek et al. ................... 701/22 |
| 2002/0109407 A1 * | 8/2002 | Morimoto et al. ........... 307/10.1 |
| 2005/0255964 A1 * | 11/2005 | Heap et al. ........................ 477/3 |
| 2007/0102206 A1 * | 5/2007 | Lee .............................. 180/65.2 |
| 2007/0213151 A1 * | 9/2007 | Usoro ............................. 474/87 |
| 2008/0147302 A1 * | 6/2008 | Kolmanovsky et al. ...... 701/105 |
| 2008/0281496 A1 * | 11/2008 | Brennan et al. ............... 701/102 |
| 2009/0071736 A1 * | 3/2009 | Mori et al. ............... 180/65.285 |
| 2009/0115378 A1 * | 5/2009 | Ko .................................. 322/25 |
| 2009/0289498 A1 * | 11/2009 | Hontani et al. .............. 307/10.1 |
| 2010/0050671 A1 * | 3/2010 | Kahn et al. ....................... 62/190 |
| 2010/0176110 A1 * | 7/2010 | Ogino et al. .................. 219/202 |
| 2010/0286830 A1 * | 11/2010 | Wijaya et al. ................. 700/276 |
| 2013/0074529 A1 * | 3/2013 | Rollinger et al. ............... 62/115 |

OTHER PUBLICATIONS definition of torque. merriam-webster dictionary website. date unknown. retreived from http://www.merriam-webster.com/dictionary/torque.*

* cited by examiner

*Primary Examiner* — Calvin Cheung
(74) *Attorney, Agent, or Firm* — Julia Voutyras; Alleman Hall McCoy Russell & Tuttle LLP

(57) ABSTRACT

A method and system for operating vehicle accessories is described. The method and system allocate an available amount of engine torque between different accessories depending on boundary conditions and nominal vehicle operating conditions. In one example, the accessories may include an air conditioner compressor, an alternator, and various vehicle electrical loads that are in electrical communication with the alternator.

19 Claims, 5 Drawing Sheets

METHOD AND SYSTEM FOR OPERATING VEHICLE ACCESSORIES

FIELD

The present description relates to a method and system for operating vehicle accessories such as an alternator and a climate control system. The method may be particularly useful for prioritizing accessory operation for vehicles that have smaller displacement engines.

BACKGROUND AND SUMMARY

Engine accessories may provide desired vehicle functions via consuming a portion of engine torque. The amount of torque consumed by an engine accessory may vary depending on the type of accessory and the level of output the accessory is providing. For example, one engine accessory may be an alternator. The alternator may supply electrical power to operate vehicle electrical systems and components such as vehicle lighting, electrical actuators, and sensors. The amount of engine torque consumed by the alternator to operate all vehicle electrical devices may vary as electrical devices are turned on and off. Consequently, engine speed can vary more than is desired by applying and releasing electrical loads from an alternator coupled to an engine. Additionally, other engine accessories may also consume engine torque without any knowledge of how much engine torque other engine accessories are consuming. As a result, the load applied to an engine via a plurality of engine accessories may be greater than is desired.

Operation of engine accessories for larger displacement engines may not result in objectionable conditions because larger displacement engines often have large amounts of engine torque reserve that may be activated in response to a change in accessory load. However, smaller engines may operate with less torque reserve so that activation of one or more engine accessories may result in a significant reduction in engine speed, or possibly an engine stall condition. If the engine is operated at higher altitudes, the engine may have even less capacity to produce torque since air density is lower at higher altitudes.

The inventors herein have recognized the above-mentioned disadvantages and have developed a method for distributing engine torque, comprising: limiting an amount of engine torque supplied to engine accessories in response to driver demand torque and available engine torque.

By limiting an amount of engine torque supplied to engine accessories based on driver demand torque and available engine torque, it may be possible to reduce the possibility of providing objectionable engine operating conditions. For example, engine accessories may be commanded to operate at torques such that when all accessory torques are added together, the torques sum to less than the limited amount of engine torque that is available to engine accessories. In this way, it may be possible to provide torque to engine accessories in an amount that reduces the possibility of engine speed variation or engine stalling.

The present description may provide several advantages. Specifically, the approach may improve distribution of engine torque to engine accessories. Further, the approach may reduce the possibility of objectionable engine operating conditions. In addition, the approach may be applied to a wide range of engine accessories. Finally, the approach may be applied to vehicles that are propelled via a motor rather than by an engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
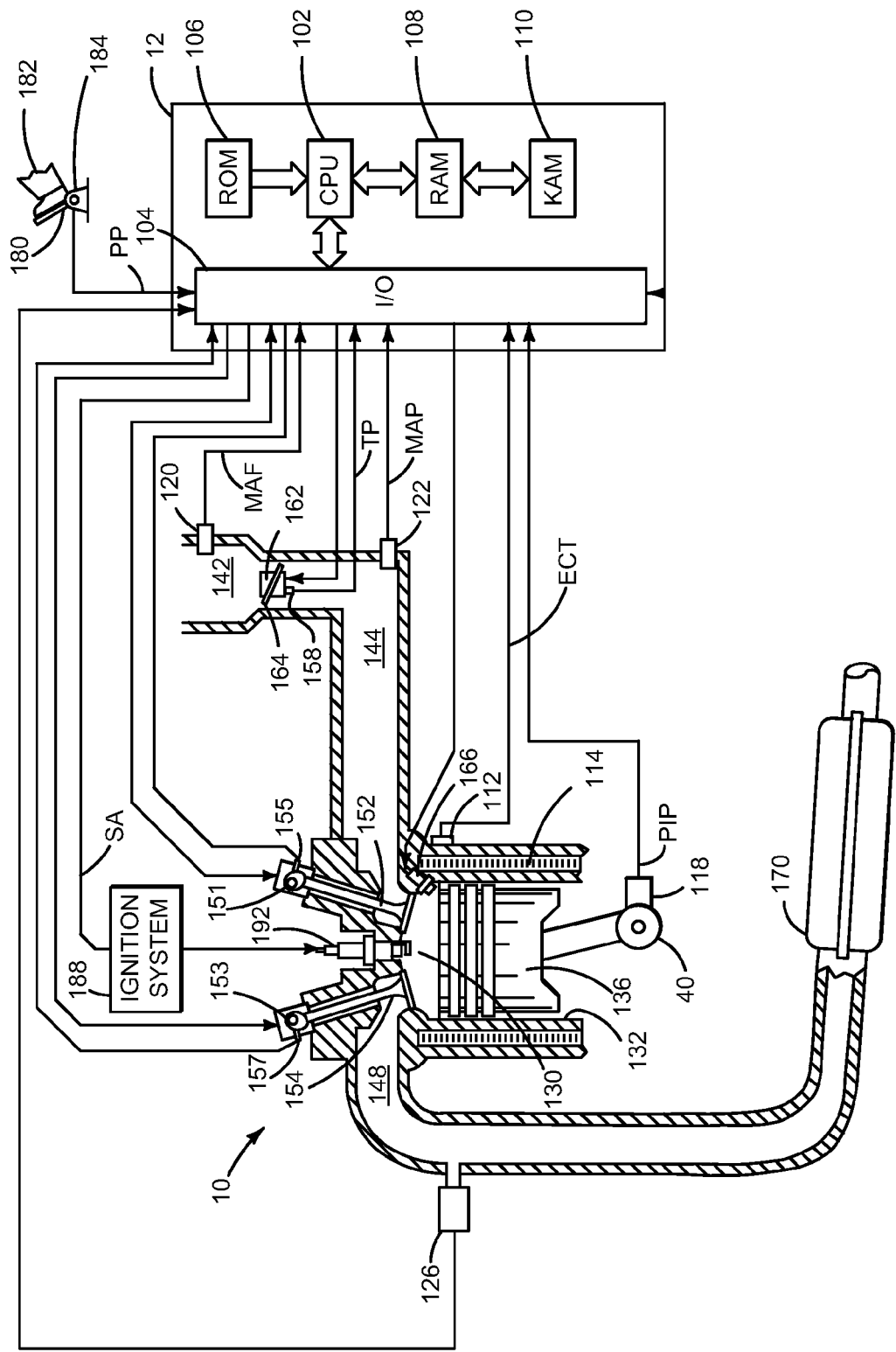
FIG. 1 is a schematic diagram of an engine that provides energy to operate vehicle accessories.
Figure 2:
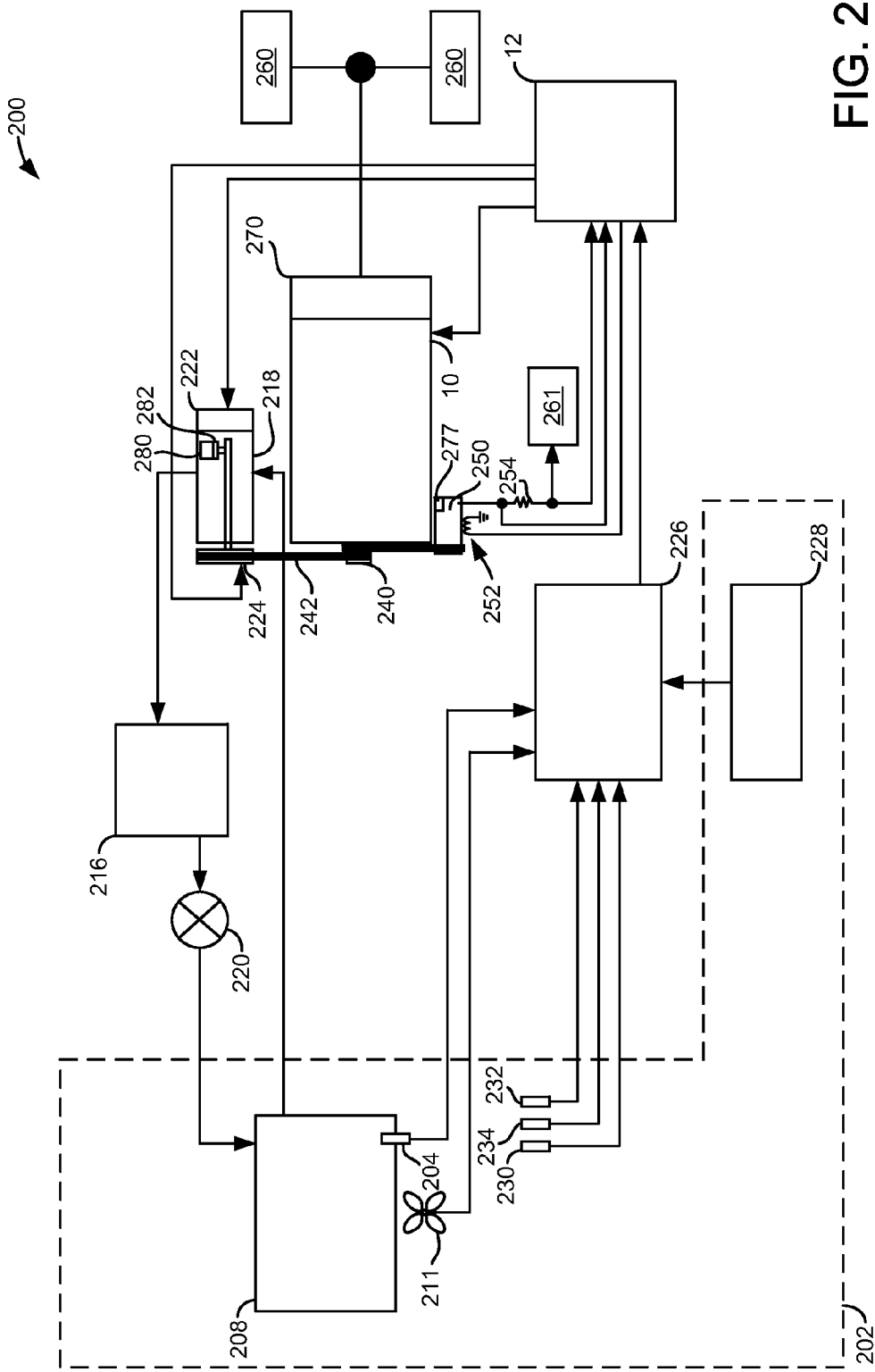
FIG. 2 is a schematic diagram of a vehicle accessory system.
Figure 4:
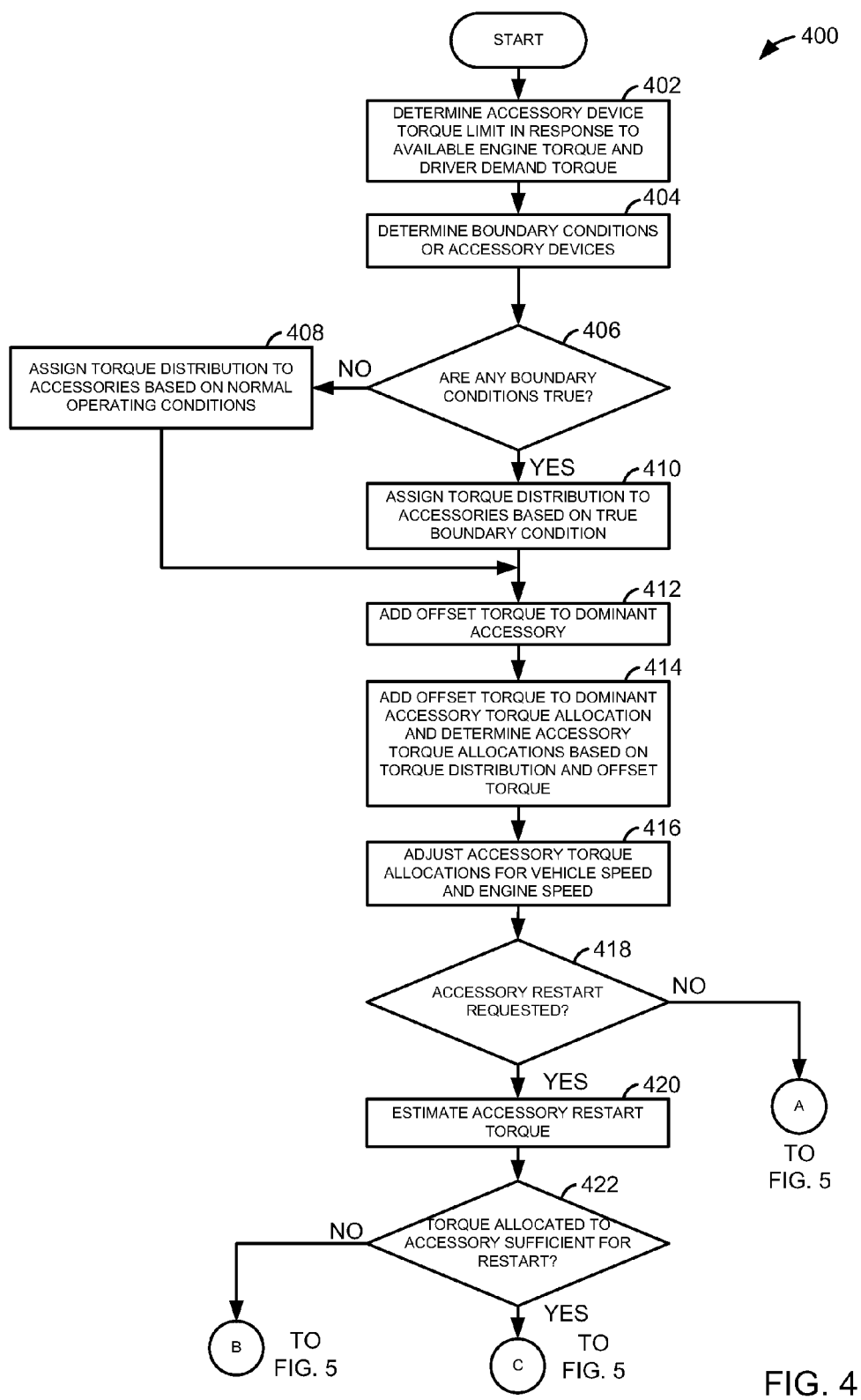
FIGS. 4 and 5 are an example method for operating vehicle accessories.
Figure 5:
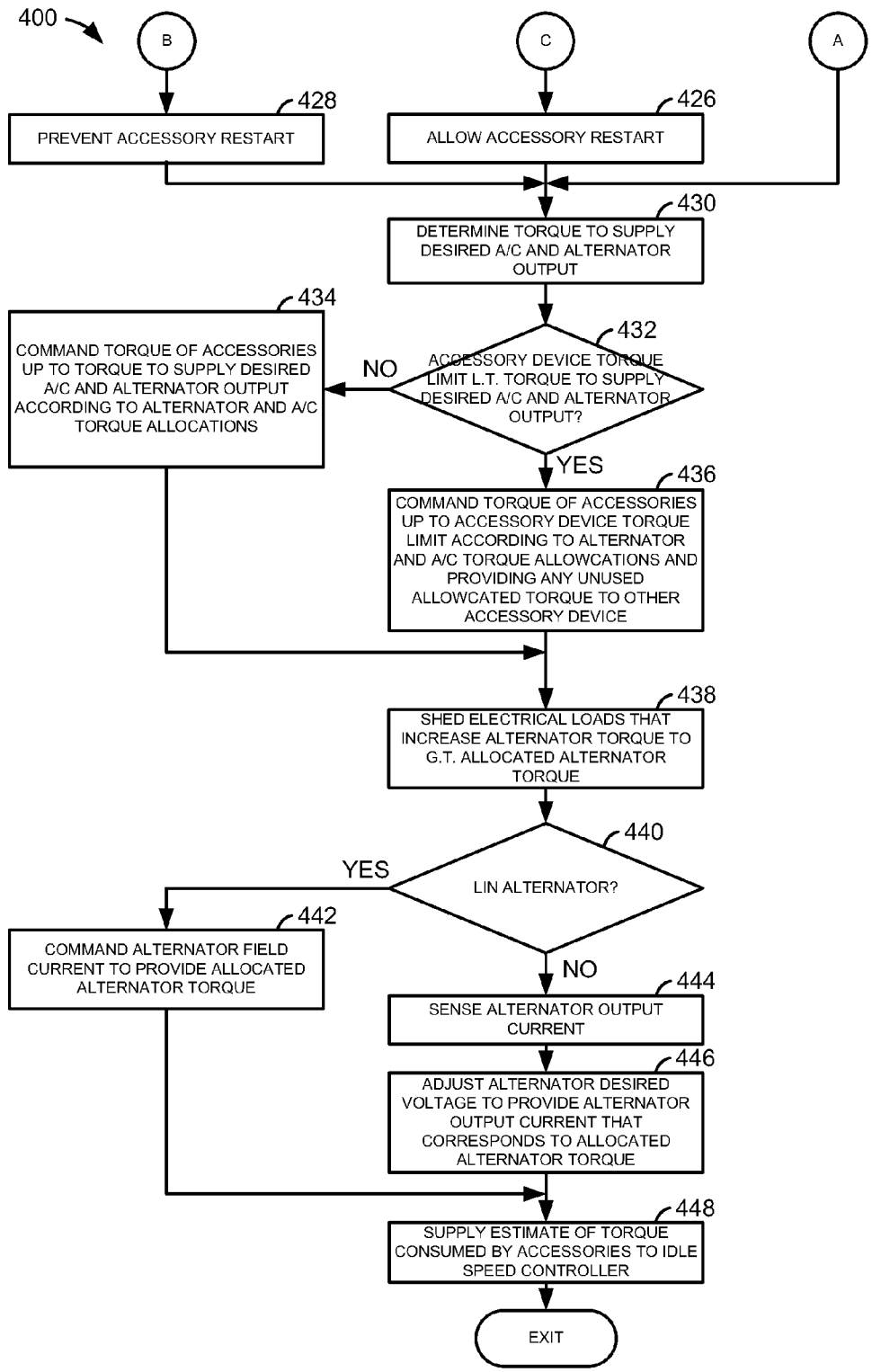

The present description is related to controlling vehicle accessories such as an air conditioning system and an alternator. The vehicle accessories may be provided power to operate via an engine as shown in FIG. 1, or a motor in alternative examples. Vehicle accessories such as the air conditioning system and the alternator may be configured as illustrated in FIG. 2. In one example, the air conditioning system and alternator are operated as shown in the example operating sequence illustrated in FIG. 3. FIGS. 4-5 show an example method for operating vehicle accessories.

Referring now to FIG. 1, one example engine is shown. In particular, engine 10 is comprised of a plurality of cylinders, one cylinder of which is shown in FIG. 1, is controlled by electronic energy conversion device controller 12. Engine 10 includes combustion chamber 130 and cylinder walls 132 with piston 136 positioned therein and connected to shaft 40 which is a crankshaft. Combustion chamber 130 is shown communicating with intake manifold 144 and exhaust manifold 148 via respective intake valve 152 and exhaust valve 154. Each intake and exhaust valve may be operated by an intake cam 151 and an exhaust cam 153. Alternatively, one or more of the intake and exhaust valves may be operated by an electromechanically controlled valve coil and armature assembly. The position of intake cam 151 may be determined by intake cam sensor 155. The position of exhaust cam 153 may be determined by exhaust cam sensor 157.

Fuel injector 166 is shown positioned to inject fuel directly into cylinder 130, which is known to those skilled in the art as direct injection. Alternatively, fuel may be injected to an intake port, which is known to those skilled in the art as port injection. Fuel injector 166 delivers liquid fuel in proportion to the pulse width of signal FPW from energy conversion device controller 12. Fuel is delivered to fuel injector 166 by a fuel system (not shown) including a fuel tank, fuel pump, and fuel rail (not shown). Fuel injector 166 is supplied operating current from controller 12. In addition, intake manifold 144 is shown communicating with optional electronic throttle 162 which adjusts a position of throttle plate 164 to control air flow from air intake 142 to intake manifold 144. In one example, a low pressure direct injection system may be used, where fuel pressure can be raised to approximately 20-30 bar. Alternatively, a high pressure, dual stage, fuel system may be used to generate higher fuel pressures.

Distributorless ignition system 188 provides an ignition spark to combustion chamber 130 via spark plug 192 in response to energy conversion device controller 12. Universal Exhaust Gas Oxygen (UEGO) sensor 126 is shown coupled to exhaust manifold 148 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Energy conversion device controller 12 is shown in FIG. 1 as a conventional microcomputer including: microprocessor unit 102, input/output ports 104, read-only memory 106, random access memory 108, keep alive memory 110, and a conventional data bus. Energy conversion device controller 12 is shown receiving various signals from sensors coupled to energy conversion device 10, in addition to those signals previously discussed, including: engine coolant temperature (ECT) from temperature sensor 112 coupled to cooling sleeve 114; a position sensor 184 coupled to an accelerator pedal 180 for sensing force applied by foot 182; a measurement of engine manifold pressure (MAP) from pressure sensor 122 coupled to intake manifold 144; an engine position sensor from a Hall effect sensor 118 sensing position of shaft 40; a measurement of air mass entering the engine from sensor 120; and a measurement of throttle position from sensor 158. Barometric pressure may also be sensed (sensor not shown) for processing by energy conversion device controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle or be replaced by a motor. The hybrid vehicle may have a parallel configuration, series configuration, or variation or combinations thereof. Further, in some examples, other engine configurations may be employed, for example a diesel engine.

During operation, each cylinder within the engine typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 130 via intake manifold 144, and piston 136 moves to the bottom of the cylinder so as to increase the volume within combustion chamber 130. The position at which piston 136 is near the bottom of the cylinder and at the end of its stroke (e.g. when combustion chamber 130 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 130. The point at which piston 136 is at the end of its stroke and closest to the cylinder head (e.g. when combustion chamber 130 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 136 back to BDC. Shaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, air conditioning system 200 includes an evaporator 208 for cooling vehicle cabin air. Air is passed over evaporator 208 via fan 211 and directed around vehicle cabin 202. Climate controller 226 operates fan 211 according to operator settings as well as climate sensors. Temperature sensor 204 provides an indication of the temperature of evaporator 208 to climate controller 226. Cabin temperature sensor 230 provides an indication of cabin temperature to climate controller 226. Similarly, humidity sensor 232 provides climate controller 226 an indication of cabin humidity. Sun load sensor 234 provides an indication of cabin heating from sun light to climate controller 226. Climate controller also receives operator inputs from operator interface 228 and supplies desired evaporator temperature and actual evaporator temperature to engine controller 12. Further, in some examples, climate controller 226 provides evaporator temperature to engine controller 12.

Operator interface 228 allows an operator to select a desired cabin temperature, fan speed, and distribution path for conditioned cabin air. Operator interface 228 may include dials and push buttons to select air conditioning settings. In some examples, operator interface 228 may accept inputs via a touch sensitive display.

Refrigerant is supplied to evaporator 208 via evaporator valve 20 after being pumped into condenser 216. Compressor 218 receives refrigerant gas from evaporator 208 and pressurizes the refrigerant. Heat is extracted from the pressurized refrigerant so that the refrigerant is liquefied at condenser 216. The liquefied refrigerant expands after passing through evaporator valve 220 causing the temperature of evaporator 208 to be reduced.

Compressor 218 includes a clutch 224, a displacement control valve 222, piston 280, and swash plate 282. Piston 280 pressurizes refrigerant in air conditioning system which flows from air conditioner compressor 218 to condenser 216. A position of swash plate 282 is adjustable to adjust the stroke of piston 280. The stroke of piston 280 varies pressure at which refrigerant is output from air conditioner compressor 218 based on oil flow through variable displacement control valve 222. Controller 12 adjusts oil flow through variable displacement control valve 222. Clutch 224 may be selectively engaged and disengaged to supply air conditioner compressor 218 with rotational energy from engine 10. In one example, engine 10 supplies rotational energy to compressor 218 and wheels 260 via transmission 270. In other examples, energy conversion device 10 is an electrical motor supplying rotational energy to air conditioner compressor 218 and wheels 260 via transmission 270. Rotational energy may be supplied to air conditioner compressor 218 from engine 10 via belt 242. In one example, belt 242 mechanically couples shaft 240 to air conditioner compressor 218 via clutch 224. Shaft 240 may be an engine crankshaft, armature shaft, or other shaft.

Engine 10 may also be mechanically coupled to an alternator 250. Alternator 250 supplies electrical energy to electrical accessories 261. Vehicle electrical accessories 261 may include but are not limited to resistive window defrosters, vehicle batteries, vehicle lighting, engine electrical actuators and sensors, fans, pumps, and seat heaters. Negative torque or load produced by alternator 250 and electrical energy output by alternator 250 may be controlled by increasing or decreasing current supplied to alternator field 252. Alternatively, alternator 250 may include a voltage regulator 277 that adjusts alternator output voltage in response to a desired alternator voltage input. Further, current output from alternator 250 may be determined via a voltage that develops across current sense resistor 254.

In this way, the system of FIG. 2 provides rotational energy to an air conditioner compressor to cool the cabin of a vehicle and an alternator. Specifically, the air conditioner compressor provides a negative torque to load the energy conversion device and compress the refrigerant so that the refrigerant can be subsequently expanded in order to cool the vehicle cabin. The amount of negative torque provided to the engine by the air conditioner compressor can be adjusting via the clutch and an actuator or valve that adjusts the variable displacement pump.

In other examples, air conditioning system may include a swash plate that is not adjustable. In still other examples, the position of swash plate 282 may be set via mechanical feedback form compressor suction pressure.

Thus, the system of FIGS. 1 and 2 provides for a system for distributing engine torque, comprising: an engine; an alternator mechanically coupled to the engine; an air conditioning system mechanically coupled to the engine; and a controller including executable instructions to partition an available amount of engine torque amongst a plurality of engine accessories including the alternator and the air conditioning system such that the total amount of the available amount of engine torque is allocated to the plurality of engine accessories, where the available engine torque is an engine torque capacity at an engine's present speed minus engine pumping torque, engine friction torque, driveline torque losses, and wheel torque.

In some examples, the system further comprises additional instructions to determine an accessory device torque limit. The system also further comprises additional instructions to assign a torque distribution for the plurality of engine accessories. The system further comprises additional instructions to assign a predetermined offset to a dominant accessory. The system further comprises additional instructions to adjust a desired voltage of the alternator in response to current output from the alternator. The system further comprises additional instructions to adjust field current supplied to the alternator in response to an amount of engine torque allocated to the alternator.

Figure 3:
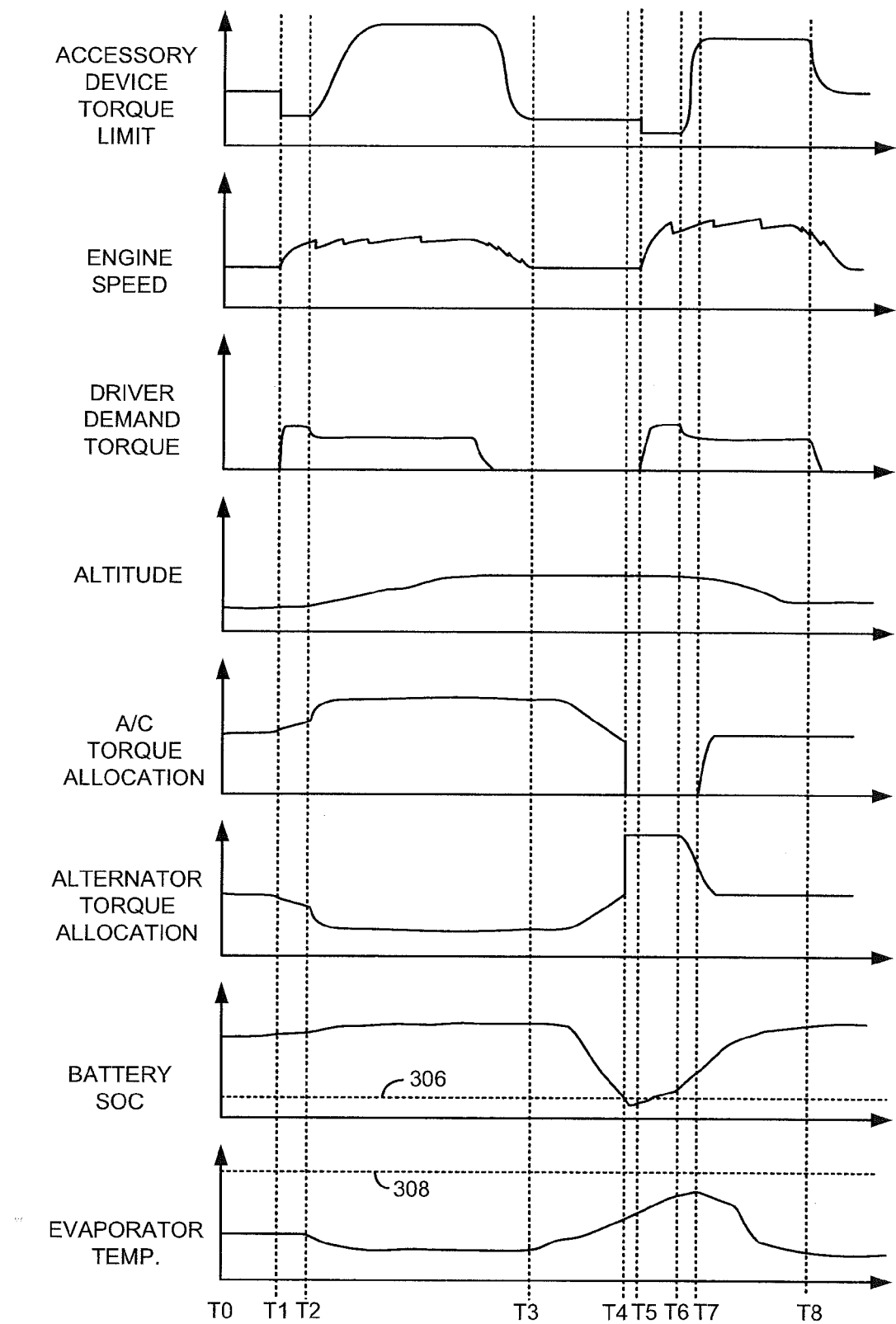
FIG. 3 is a prophetic example vehicle operating sequence.

FIG. 3 is a prophetic vehicle operating sequence. The vehicle operating sequence may be provided by the system of FIGS. 1 and 2 according to the method of FIGS. 4 and 5. Vertical markers T0-T8 identify times of interest during the vehicle operating sequence.

The first plot from the top of FIG. 3 shows a plot of the vehicle accessory drive torque limit versus time. The X axis represents time and the Y axis represents the accessory device torque limit. Time increases from the left side of the X axis to the right side of the X axis. The accessory device torque limit increases from the X axis in the direction of the Y axis arrow.

The vehicle accessory drive torque limit is an amount of torque that may be supplied to the engine accessories at the present operating conditions. In one example, the vehicle accessory drive torque limit may be determined from a table or function that is indexed via driver demand torque and available engine torque. Table or function output is empirically determined. The driver demand torque may be determined via a position of an accelerator pedal. The available engine torque is determined as described at 402 of FIG. 4.

The second plot from the top of FIG. 3 is a plot of engine speed versus time. The X axis represents time and the Y axis represents engine speed. Time increases from the left side of the X axis to the right side of the X axis. Engine speed increases from the X axis in the direction of the Y axis arrow.

The third plot from the top of FIG. 3 is a plot of driver demand torque versus time. The X axis represents time and the Y axis represents driver demand torque. Time increases from the left side of the X axis to the right side of the X axis. Driver demand torque increases from the X axis in the direction of the Y axis arrow.

The fourth plot from the top of FIG. 3 is a plot of altitude versus time. The X axis represents time and the Y axis represents the altitude at which the vehicle and engine are operating. Time increases from the left side of the X axis to the right side of the X axis. Altitude increases from the X axis in the direction of the Y axis arrow. Altitude may be estimated via barometric pressure.

The fifth plot from the top of FIG. 3 is a plot of engine torque allocated to an air conditioning system versus time. The X axis represents time and the Y axis represents the engine torque allocated to the air conditioning system. Time increases from the left side of the X axis to the right side of the X axis. The engine torque allocated to the air conditioning system increases from the X axis in the direction of the Y axis arrow. In one example, the engine torque allocated to the air conditioning system may be expressed as a percentage of available engine torque.

The sixth plot from the top of FIG. 3 is a plot of engine torque allocated to an alternator versus time. The X axis represents time and the Y axis represents the engine torque allocated to the alternator. Time increases from the left side of the X axis to the right side of the X axis. Engine torque allocated to the alternator increases from the X axis in the direction of the Y axis arrow. In one example, the engine torque allocated to the alternator may be expressed as a percentage of available engine torque.

The seventh plot from the top of FIG. 3 is a plot of battery state of charge (SOC) versus time. The X axis represents time and the Y axis represents the battery SOC. Time increases from the left side of the X axis to the right side of the X axis. SOC increases from the X axis in the direction of the Y axis arrow. In one example, battery SOC may be determined via battery voltage. Horizontal line 306 represents a boundary limit low state of battery charge for battery SOC less than the level of line 306.

The eighth plot from the top of FIG. 3 is a plot of air conditioner evaporator temperature versus time. The X axis represents time and the Y axis represents the air conditioning system evaporator temperature. Time increases from the left side of the X axis to the right side of the X axis. Air conditioning system evaporator temperature increases from the X axis in the direction of the Y axis arrow. The air conditioning systems capacity to reduce vehicle cabin temperature decreases as evaporator temperature increase. Thus, the vehicle occupants may become uncomfortable as evaporator temperature increases. Horizontal line 308 represents a boundary limit high state of evaporator temperature for evaporator temperature greater than the level of line 308.

At time T0, engine speed is at idle speed, and the vehicle in which the engine operates is at a lower altitude. At lower altitudes, the air pressure is greater than at higher altitudes so that the engine may provide a greater amount of torque. The accessory device torque limit is at a medium level since the engine has some capacity to provide additional torque to accessories at the present operating conditions. The driver demand torque is zero and the engine torque allocated to the air conditioning and alternator are at medium levels. The battery SOC is at a higher level and the air conditioning system evaporator temperature is at a medium level, thereby indicating that the vehicle's cabin temperature may be reduced via passing air over the evaporator and supplying the cooled air to the vehicle cabin.

At time T1, the driver demand torque increases in response to a driver applying an accelerator pedal. The accessory device torque limit is reduced in response to the increasing driver demand torque. By reducing the accessory device torque limit, it may be possible to increase vehicle acceleration without the driver noticing any indication of accessory performance degradation since additional torque may be supplied to vehicle accessories a short time later. Engine speed begins to increase as additional engine torque is provided to accelerate the vehicle. The altitude at which the vehicle is operating increases as the engine accelerates the vehicle. The engine torque allocated to the air conditioning system increases in response to the engine torque allocated to the alternator decreasing. The engine torque allocated to the alternator is decreased in response to the battery SOC increasing to a higher level where little battery charging is desired. Although the engine torque allocated to the air conditioner is increased, the amount of engine torque actually delivered to the air conditioner may decrease since the accessory device torque limit is reduced. The evaporator temperature remains at a middle level.

Between time T1 and time T2, the engine is launching the vehicle. Consequently, the accessory device torque limit is maintained at a low level so that the engine may provide additional torque to accelerate the vehicle instead of increasing output of accessories. Engine speed continues to accelerate as the launch time increases. The driver demand torque reaches a threshold level and stabilizes. The vehicle altitude continues to increase and the engine torque allocation between the alternator and the air conditioning system is adjusted to increase the percentage of engine torque available to the air conditioning system and decrease the percentage of engine torque available to the alternator. The battery SOC remains at a higher level and the evaporator temperature remains at a middle level.

At time T2, the vehicle launch period ends in response to vehicle speed and a reduction in driver demand torque. The engine speed begins to level out as vehicle acceleration is reduced. The altitude which the vehicle operates continues to increase and the torque allocation to the alternator continues to decrease in response to the battery SOC. The engine torque allocation to the air conditioning system increases in response to the decreasing engine torque allocated to the alternator. The accessory device torque limit begins to increase since engine speed is elevated and since the vehicle launch has ended. The battery SOC continues to increase, but at a lower rate.

Between time T2 and time T3, the accessory device torque limit is increased to a higher level since the engine is operating at a higher speed than idle speed where the engine has the capacity to provide additional torque as compared to when the engine is operated at idle. The driver demand torque is maintained at a constant level and the vehicle continues to climb to a higher altitude. The engine torque allocated to the air conditioning system stabilizes at a higher level and the engine torque allocated to the alternator stabilizes at a lower level. The evaporator temperature decreases in response to increasing engine torque supplied to the air conditioning system. Engine torque supplied to the air conditioning system is increased in response to the higher accessory device torque limit and the higher air conditioning system torque allocation. The driver demand torque is decreased by the driver before time T3 and the engine speed is reduced toward idle speed in response to the reduction in driver demand torque.

At time T3, the engine reaches idle speed and the vehicle is operating at a higher altitude. Consequently, the engine has less capacity to provide additional torque to vehicle accessories since air density is lower at higher altitudes. Further, even if the engine intake air pressure may be boosted via a turbocharger, the turbocharger operates at a low speed at engine idle so that little boost is available to the engine. The accessory device torque limit is reduced to a level lower than the level at time T1 because the engine has less capacity to provide torque at idle when operated at altitude. The engine torque allocated to the air conditioning system remains at a higher level and the engine torque allocated to the alternator remains at a lower level. The evaporator temperature begins to increase since the accessory device torque limit lowers the amount of engine torque supplied to operate the air conditioning system.

Between time T3 and time T4, electrical devices (not shown) are activated and the battery SOC is reduced as the electrical devices consume energy from the battery and the alternator. The accessory device torque limit remains constant and the engine speed remains at idle speed. The driver demand torque remains at zero and the engine torque allocated to the air conditioning system and the engine torque allocated to the alternator remain constant. The evaporator temperature continues to increase since engine torque available to the air conditioning system is limited by the accessory device torque limit and the engine torque allocated to the alternator torque.

At time T4, the battery SOC is reduced to a level less than the boundary limit for low battery SOC 306. Consequently, the engine torque allocated to the air conditioning system is reduced to zero and the engine torque allocated to the alternator is increased to 100 percent. However, other engine torque allocations may be provided. By driving the engine torque allocated to the air conditioning system to zero, the air conditioning clutch may be opened and the swash plate may be positioned at a low torque position. The engine torque available to the alternator remains limited to a lower level via the accessory device torque limit. The vehicle altitude remains unchanged and the evaporator temperature continues to increase.

At time T5, the drive demand torque increases in response to a driver applying the accelerator pedal. The engine speed increases in response to the higher driver demand torque, but the accessory device torque limit is reduced to improve vehicle launch. The vehicle altitude begins to decrease and the engine torque allocated to the alternator remains at a higher level. The engine torque allocated to the air conditioning system remains at a lower level and the evaporator temperature continues to increase. The battery SOC increases at a lower rate in response to the lower accessory device torque limit.

At time T6, the vehicle launch period ends in response to a reduction in driver demand torque and a higher vehicle speed. The accessory device torque limit begins to increase, but the engine torque allocated to the air conditioning system combined with the accessory device torque limit is less than an air conditioning system restart torque (e.g., an amount of torque applied to the engine via the air conditioning system when the air conditioning system is reactivated). Therefore, the air conditioning system is not restarted. The evaporator temperature continues to increase, but it has not reached the high evaporator temperature boundary 308. The battery SOC also continues to increase and the vehicle continues to move toward a lower altitude.

At time T7, the accessory device torque limit has increased to a higher level and the engine torque allocated to the air conditioning system is high enough so that there is more engine torque available to the air conditioning system than the air conditioning system restart torque. Therefore, the air conditioning clutch is closed and the swash plate position is adjusted (not shown) to reduce evaporator temperature. The engine torque allocated to the alternator continues to decrease in response to the increasing state of battery charge. The vehicle altitude continues to decrease.

Between time T7 and time T8, the accessory device torque limit remains at a higher level since engine speed is elevated. The driver demand torque remains constant and the vehicle's altitude continues to decrease. The engine torque allocated to the air conditioning system increases to a middle level and the alternator torque is reduced to a middle level. The battery SOC increases and begins to approach a higher level. The air conditioning system evaporator temperature continues to decrease.

At time T8, the driver demand torque is reduced in response to a driver releasing an accelerator pedal. The engine speed begins to fall and the vehicle is at a lower altitude. The accessory device torque limit is reduced in response to the lower engine speed. The evaporator temperature is reduced to a lower level and the battery SOC is increased to a higher level.

In this way, engine torque supplied to and consumed by vehicle accessories may be controlled. Different accessories are provided different engine torque allocations based on vehicle operating conditions. Further, torque to restart accessory devices is also considered by the system so that accessories are not restarted before the engine may provide torque without torque being removed from the vehicle driveline. In other words, restarting of accessory devices is limited to conditions where engine torque supplied to the vehicle driveline may be maintained at a constant level.

Referring now to FIGS. 4 and 5, a method for operating vehicle accessories is shown. The method of FIGS. 4 and 5 may be stored as executable instructions in non-transitory memory of controller 12 shown in FIGS. 1 and 2. Further, the method of FIGS. 4 and 5 may provide the sequence shown in FIG. 3.

At 402, method 400 determines an accessory device torque limit in response to available engine torque and driver demand torque. The available engine torque is:

$$T_{avail} = T_{eng\_cap} - T_{eng\_pump} - T_{eng\_fric} - T_{dry\_loss} - T_{wheel}$$

Where $T_{avail}$ is available engine torque, $T_{eng\_cap}$ is engine torque capacity (e.g., maximum engine torque at the present engine speed), $T_{eng\_pump}$ is engine pumping torque, $T_{eng\_fric}$ is engine friction torque, $T_{dry\_loss}$ is driveline torque losses from the transmission and axle, and where $T_{wheel}$ is torque delivered to the vehicle wheels. Thus, after subtracting torque supplied to vehicle wheels, torque losses in the engine and driveline, engine torque available to accessories may be determined. Engine pumping torque, engine friction torque, and driveline torque losses may be empirically determined and stored in tables or functions indexed via engine speed, vehicle speed, and selected transmission gear. Wheel torque may be determined from estimated engine torque based on engine speed and engine air flow, torque converter impeller speed, torque converter turbine speed, and driveline gear ratios. Method 400 proceeds to 404 after available engine torque is determined.

If the engine is replaced by a motor, available motor torque may be substituted for available engine torque. Available motor torque is motor torque output capacity at the present motor speed minus motor torque losses, driveline losses, and wheel torque.

At 404, method 400 determines boundary conditions for accessory devices. Boundary conditions for accessory devices may include but are not limited to an alternator degradation state, degraded battery state, low battery SOC, low battery electrolyte temperature, high air conditioner evaporator temperature, air conditioning system off, and selective battery charging with air conditioning on. In one example, boundary conditions may be empirically determined and stored in memory. Method 400 proceeds to 406 after boundary conditions are determined.

At 406, method 400 judges whether or not any of the boundary conditions are true. For example, method 400 judges whether or not the battery is in a degraded state or if the air conditioner evaporator temperature is at or above the high evaporator boundary temperature. If one or more boundary conditions are true, the answer is yes and method 400 proceeds to 410. Otherwise, the answer is no and method 400 proceeds to 408.

At 408, method 400 assigns a torque distribution to accessories based on normal or base operating conditions. In particular, method 400 provides a torque distribution based on operating states of predetermined constraints. For example, a torque distribution may be based on a level of engine idle stability, battery SOC, a difference between actual cabin temperature and desired cabin temperature, and lamp flicker. In this example, engine idle stability may be given highest priority followed by battery SOC, followed by difference in cabin temperature, followed by lamp flicker. If idle stability is less than desired, method 400 outputs a predetermined torque distribution to accessories based on idle stability objectives not being met. The other normal operating condition constraints of lesser priority do not affect the final torque distribution when a higher priority condition is not being met. This predetermined distribution is realized via a torque offset to the dominant accessory based on the amount of available torque.

In another example, if idle stability is at a desired level, but battery SOC is less than desired, method 400 outputs a predetermined torque distribution to accessories based on low battery SOC. The other normal operating condition constraints of lesser priority do not affect the final torque distribution. Method 400 proceeds to 412 after accessory torque distribution objectives are assigned.

In one example, the torque distribution for each accessory may be defined as one half the available torque plus an offset, expressed as a scalar, of the accessory device torque limit.

At 410, method 400 assigns a torque distribution between accessory devices based on boundary conditions that are true. Boundary conditions are assigned an order or priority. If a higher priority boundary condition is true, a torque distribution applied to accessory devices follows a torque distribution based on the higher priority boundary condition and the torque distributions based on the lower priority boundary conditions are not applied to the accessories. Further, the boundary conditions have higher priority than normal operating conditions at 408. Therefore, if a boundary condition is true, the torque distribution assigned to accessories is based on the boundary condition that is true rather than any normal operating condition that is not being met. Method 400 proceeds to 412 after torque distributions applied to accessories is determined.

At 412, method 400 assigns an offset torque to a dominant accessory. One accessory may be selected as a dominant accessory over other accessories based on present operating conditions. For example, an alternator may be assigned as a dominant accessory over an air conditioning system when desired cabin temperature is within a predetermined temperature range of ambient temperature. The offset is an amount of torque that may vary with operating conditions and the selected dominant accessory. For example, if the dominant accessory is an alternator, the offset torque may be 4 N-m. On the other hand, if the dominant accessory is an air conditioning system, the offset torque may be 8 N-m. Method 400 proceeds to 414 after the torque offset is determined.

At 414, method 400 adds the offset torque to the torque allocated to the dominant accessory to determine torque allocated to accessories. For example, if the torque offset is 5 N-m and the accessory device torque limit determined at 402 is 40 N-m, the torque allocation between accessory devices may be determined as described herein. In particular, one half of 40 N-m is 20 N-m, plus 5 N-m, yielding an allocation of 25 N-m of torque to the dominant accessory. The subservient accessory is allocated 20 N-m minus 5 N-m, or 15 N-m of torque. Method 400 proceeds to 416 after accessory torques are determined.

At 416, method 400 provides for adjusting accessory torques based on engine speed and vehicle speed. In one example, torque allocated to an accessory is blended between the final torque determined in 414 and the unlimited torque required by the accessory as a result of a lookup into a table or function that is indexed based on engine speed and vehicle speed. For example, at low engine speeds and low vehicle speeds greater than zero, the scalar may reduce accessory torques to the accessory device torque limit determined at 402 so as to increase the amount of torque that may be delivered to vehicle wheels, thereby improving vehicle launch. Further, the table or function at 416 may be used to blend out the influence of method 400 so that accessories may demand as much torque or as little torque as determined by the accessory to meet accessory requirements rather than constraints placed on accessories by method 400. One way to implement such a blend function is to adjust the value of the scalars indexed during selected operating conditions. A large scalar may allow accessories to consume torque up to their operating limits. Such operation may be desirable at higher vehicle speeds and engine speeds where consumption of torque by accessories may be less noticeable to a driver. Method 400 proceeds to 418 after accessory torque allocations have been adjusted for engine speed and vehicle speed.

At 418, method 400 judges whether or not an accessory restart is requested. An accessory may stop providing output (e.g., an air conditioning system may open an air conditioning clutch and adjust a swash plate to a low torque position) in response to boundary conditions as determined at 404 or vehicle operating conditions. Further, an accessory may stop operating when engine torque allocated to operate the accessory is less than a threshold torque necessary to operate the accessory. The same accessory may be requested to restart when boundary or operating conditions change. For example, an accessory restart may be requested after engine torque allocated to operate the accessory is greater than the threshold torque necessary to operate the accessory. If method 400 judges that an accessory restart is requested, the answer is yes and method 400 proceeds to 420. If method 400 judges than an accessory restart is not requested, the answer is no and method 400 proceeds to 430 of FIG. 5.

At 420, method 400 estimates the torque for restarting the accessory. The torque for restarting the accessory may be considerably higher than the threshold torque for operating the accessory since frictional, windage, and other forces may be necessary to overcome when restarting the accessory. In one example, a table or function that includes torque values for restarting an accessory may be indexed based one ambient temperature and accessory speed. The table outputs an empirically determined maximum torque for restarting the accessory. Method 400 proceeds to 422 after the accessory restart torque is determined.

At 422, method 400 judges whether or not torque allocated to the accessory at 416 is greater than the accessory restart torque determined at 420. If the torque allocated for the accessory from 416 is greater than the torque to restart the accessory at 420, the answer is yes and method 400 proceeds to 426 of FIG. 5. Otherwise, the answer is no and method 400 proceeds to 428 of FIG. 5.

At 426, method 400 allows the accessory to restart. The accessory may be restarted via closing a clutch, supplying current to a field coil, or in another manner suitable for the particular accessory. Method 400 proceeds to 430 after restarting the accessory.

At 428, method 400 prevents the accessory from restarting. The accessory may be prevented from restarting via holding a clutch open, preventing or limiting current supplied to a field, or in another manner suitable for the particular accessory.

At 430, method 400 determines an amount of engine torque to supply a desired output of the accessory. In one example where the accessories are an air conditioning system and an alternator, the engine torque to supply the desired electrical energy from the alternator may be determined via alternator output current, or commanded alternator field current. The engine torque to provide the desired number of watts may be determined from a function or table that outputs engine torque as a function of alternator output (e.g., watts) and alternator speed. The air conditioning system torque to provide a desired evaporator temperature may be determined based on output pressure and compressor speed. A table or function that is indexed via output pressure and swash plate angle, as a function of compressor speed, that outputs an empirically determined torque to provide the desired evaporator temperature. Torques for other accessories may be determined in a similar way. Method 400 proceeds to 432 after determining engine torque to provide the desired accessory outputs.

At 432, method 400 judges whether or not the accessory device torque limit is less than (L.T.) torque to supply desired accessory output. In one example where the accessories are an air conditioner and an alternator, method 400 judges if the accessory device torque limit is less than torque to supply a desired amount of electrical power from the alternator and a desired evaporator temperature. If so, the answer is yes and method 400 proceeds to 436. If not, the answer is no and method 400 proceeds to 434.

At 434, method 400 commands accessories to provide a desired output for each accessory. For example, if the desired output of the alternator is 300 watts using X N-m of engine torque and the desired air conditioner evaporator temperature is 10° C. using Y N-m of engine torque, the alternator field is supplied current so that the alternator outputs 300 watts and the air conditioner swash plate is adjusted to provide 10° C. at the evaporator. If the accessory is an alternator, the alternator command adjusts field current or a voltage regulator command as described at 442-448. If the accessory is an air conditioning system clutch, the clutch may be commanded open or closed via an electrical actuator. If the accessory is an air conditioning system compressor, a displacement control valve may be adjusted to vary compressor displacement to vary compressor torque. Method 400 proceeds to 438 after the accessories are commanded to provide their respective desired outputs.

At 436, method 400 commands accessories to use up to the accessory device torque limit determined at 402. Each accessory is commanded to an output level that uses the amount of torque allocated to the particular accessory at 416, or a value less than the amount of torque allocated to the particular accessory at 416 when the desired output for the accessory uses less engine torque than the amount of torque allocated to the accessory at 416. For example, if the alternator is allocated 40 N-m at 416, but only 30 N-m of engine torque is used to provide desired alternator output, the remaining 10 N-m are re-allocated to the other accessories. On the other hand, if the alternator is allocated 40 N-m at 416, but the torque to supply the desired alternator output as determined at 430 is 50 N-m, the alternator field current is adjusted so that the alternator consumes 40 N-m of engine torque (e.g., the amount of engine torque allocated to the alternator). Air conditioning system torque is commanded in a similar way.

If the accessory is an alternator, the alternator command adjusts field current or a voltage regulator command as described at 442-448. If the accessory is an air conditioning system clutch, the clutch may be commanded open or closed via an electrical actuator. If the accessory is an air conditioning system compressor, a displacement control valve may be adjusted to vary compressor displacement to vary compressor torque. Any engine torque allocated to an accessory that is not consumed by the accessory is distributed to other accessories so that all available engine torque may be consumed by accessories to meet desired accessory output. Method 400 proceeds to 438 after accessory torques are commanded.

At 438, method 400 sheds electrical loads that are electrically coupled to the alternator until the electrical load applied to the alternator is less than or equal to the amount of electrical power supplied by the alternator when the alternator is operated at using the amount of engine torque allocated at 436 or 434. The electrical loads may be shed via a command to the Body Control Module that allows current to flow from the alternator to the electrical load. Of course, the allocation of electrical power to electrical loads may be prioritized. Method 400 proceeds to 442 after electrical loads may be shed.

At 440, method 400 judges whether or not the alternator is a local interconnect network (LIN) alternator. Method 400 may judge whether or not the alternator is a LIN alternator based on status of a bit stored in memory. If method 400 judges that a LIN alternator is present, the answer is yes and method 400 proceeds to 442. Otherwise, the answer is no and method 400 proceeds to 444.

At 442, method 400 the alternator command is supplied to the LIN alternator to directly adjust alternator field current. The alternator field current is adjusted to provide engine torque allocated to the alternator at the alternator based on output of a table or function that outputs alternator field current as a function of alternator load torque. For example, the engine torque allocated to the alternator is used to index a table or function that outputs a field current. The LIN alternator field current is then adjusted to the field current output from the table and the engine is loaded with engine torque allocated to the alternator. Method 400 proceeds to 448 after LIN alternator output is adjusted.

At 448, method 400 supplies an estimate of accessory load torques to the engine system for adjusting engine actuators that alter engine torque. For example, if the field current or a voltage regulation setting of an alternator is adjusted to use 25 N-m of engine torque an estimate of alternator torque load based on field current or alternator power output is supplied to the engine idle speed controller and/or torque control routines so that the engine controller has an estimate of loads on the engine. Engine torque actuators such as the engine throttle, cams, fuel injectors, ignition systems, and valve lift mechanisms are adjusted to increase or decrease engine torque based on increases or decreases in torque applied to the engine via accessories. Method 400 proceeds to exit after a torque estimate is provided for operating engine torque actuators.

At 444, method 400 determines alternator output current. In one example, alternator output current may be determined by monitoring a voltage that develops across a current sense resistor. The voltage across the sense resistor is indicative of current flow through the resistor. Method 400 proceeds 446 after current output of the alternator is determined.

At 446, method 400 adjusts a desired alternator output voltage in response to current output of the alternator. In particular, if current output from the alternator is less than is desired, a desired voltage supplied to a voltage regulator controlling output of the alternator is increased. If current output from the alternator is greater than is desired, the desired voltage supplied to the voltage regulator controlling output of the alternator is decreased. The desired output current of the alternator is determined from the amount of engine torque allocated to the alternator and a transfer function that describes alternator load torque as a function of alternator output current. In this way, alternator torque may be closed loop controlled via alternator current and a voltage regulator that controls alternator output voltage.

Thus, the method of FIGS. 4 and 5 provides for distributing engine torque, comprising: limiting an amount of engine torque supplied to engine accessories in response to driver demand torque and available engine torque. The method includes where available engine torque is an engine torque capacity at an engine's present speed minus engine pumping torque, engine friction torque, driveline torque losses, and wheel torque. The method includes where the amount of engine torque supplied to engine accessories is limited via limiting output of engine accessories.

In one example, the method includes where the engine accessories include an alternator, and where output of the alternator is limited via adjusting a voltage regulator input of the alternator in response to current sensed at an output of the alternator. The method includes where limiting an amount of engine torque supplied to engine accessories includes stopping or ceasing output from one engine accessory. The method further comprises restarting output from the one engine accessory in response to an increase in an engine accessory device torque limit. The method further comprises preventing restarting output from the one engine accessory in response to a restart torque of the one engine accessory being greater than engine torque allocated to operate the one engine accessory. The method includes where the engine torque allocated to operate the engine accessory is based on a torque distribution to a plurality of engine accessories.

The method of FIGS. 4 and 5 also provides for distributing engine torque, comprising: supplying electrical power via an alternator; supplying cooling to a vehicle cabin via an air conditioning system; and adjusting torque of the alternator and torque of the air conditioning system applied to an engine in response to an available amount of engine torque. A method includes where available engine torque is an engine torque capacity at an engine's present speed minus engine pumping torque, engine friction torque, driveline torque losses, and wheel torque.

In some examples, the method further comprises adjusting torque of the alternator and torque of the air conditioning system in response to a predetermined torque distribution. The method includes where the predetermined torque distribution is based on a plurality of prioritized boundary conditions. The method further comprises consuming a portion of an amount of torque allocated to a first accessory via the first accessory and consuming a remaining portion of the amount of torque allocated to the first accessory via a second accessory. The method also further comprises shedding electrical loads applied to the alternator to reduce alternator electrical load to less than an electrical output provided by operating the alternator at an allocated amount of the available amount of engine torque.

As will be appreciated by one of ordinary skill in the art, routines described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for distributing engine torque, comprising:
   limiting, via a controller, an amount of engine torque supplied to engine accessories in response to driver demand torque and available engine torque and where the amount of engine torque supplied to engine accessories is limited via limiting output of engine accessories.

2. The method of claim 1, where available engine torque is an engine torque capacity at an engine's present speed minus engine pumping torque, engine friction torque, driveline torque losses, and wheel torque.

3. The method of claim 2, where the engine accessories include an alternator, and where output of the alternator is limited via adjusting a voltage regulator input in response to current sensed at an output of the alternator.

4. A method for distributing engine torque, comprising:
   limiting, via a controller, an amount of engine torque supplied to engine accessories in response to driver demand torque and available engine torque, where limiting an amount of engine torque supplied to engine accessories includes stopping or ceasing output from one engine accessory.

5. The method of claim 4, further comprising restarting output from the one engine accessory in response to an increase in an engine accessory device torque limit.

6. The method of claim 5, further comprising preventing restarting output from the one engine accessory in response to a restart torque of the one engine accessory being greater than engine torque allocated to operate the one engine accessory.

7. The method of claim 6, where the engine torque allocated to operate the engine accessory is based on an engine torque distribution to a plurality of engine accessories.

8. A method for distributing engine torque, comprising:
   supplying electrical power via an alternator;
   supplying cooling to a vehicle cabin via an air conditioning system; and
   adjusting torque of the alternator and torque of the air conditioning system applied to an engine in response to an available amount of engine torque.

9. The method of claim 8, where available engine torque is an engine torque capacity at an engine's present speed minus engine pumping torque, engine friction torque, driveline torque losses, and wheel torque.

10. The method of claim 8, further comprising adjusting torque of the alternator and torque of the air conditioning system in response to a predetermined torque distribution, where adjusting torque of the alternator includes reducing a field current, and adjusting torque of the air condition system includes adjusting a position of a compressor swash plate.

11. The method of claim 10, where the predetermined torque distribution is based on a plurality of prioritized boundary conditions.

12. The method of claim 8, further comprising consuming a portion of an amount of engine torque allocated to a first accessory via the first accessory and consuming a remaining portion of the amount of engine torque allocated to the first accessory via a second accessory.

13. The method of claim 8, further comprising shedding electrical loads applied to the alternator to reduce alternator electrical load to less than an electrical output provided by operating the alternator at an allocated amount of the available amount of engine torque.

14. A system for distributing engine torque, comprising:
   an engine;
   an alternator mechanically coupled to the engine;
   an air conditioning system mechanically coupled to the engine; and
   a controller including executable instructions to partition an available amount of engine torque amongst a plurality of engine accessories including the alternator and the air conditioning system such that a total amount of the available amount of engine torque is allocated to the plurality of engine accessories, where the available engine torque is an engine torque capacity at an engine's present speed minus engine pumping torque, engine friction torque, driveline torque losses, and wheel torque.

15. The system of claim 14, further comprising additional instructions to determine an accessory device torque limit.

16. The system of claim 15, further comprising additional instructions to assign a torque distribution for the plurality of engine accessories.

17. The system of claim 16, further comprising additional instructions to assign a predetermined offset to a dominant accessory.

18. The system of claim 14, further comprising additional instructions to adjust a desired voltage of the alternator in response to current output from the alternator.

19. The system of claim 18, further comprising additional instructions to adjust field current supplied to the alternator in response to an amount of engine torque allocated to the alternator.

* * * * *